106-99
7/13/76
AU 115  EX
XR  3,969,121

United States Patent [19]
Atkinson

[11] 3,969,121
[45] July 13, 1976

[54] GLASS COMPOSITIONS AND FIBERS MADE THEREFROM

[75] Inventor: Alan W. Atkinson, Rochdale, England

[73] Assignee: TBA Industrial Products Limited, Manchester, England

[22] Filed: Jan. 9, 1976

[21] Appl. No.: 647,988

Related U.S. Application Data

[63] Continuation-in-part of Ser. No. 441,984, Feb. 13, 1974, abandoned.

[30] Foreign Application Priority Data

Feb. 14, 1973  United Kingdom............. 7151/73

[52] U.S. Cl................................. 106/50; 106/52; 106/54; 106/99
[51] Int. Cl.² ................. C03C 13/00; C03C 3/04; C04B 31/06
[58] Field of Search ............... 106/50, 52, 54, 99

[56] References Cited
UNITED STATES PATENTS

| | | |
|---|---|---|
| 2,640,784 | 6/1953 | Tiede et al............... 106/54 X |
| 2,877,124 | 3/1959 | Welsch................... 106/50 X |
| 3,127,277 | 3/1964 | Tiede..................... 106/50 |
| 3,523,803 | 8/1970 | Haslay et al............. 106/50 |
| 3,736,162 | 5/1973 | Chvaroisky.............. 106/50 UX |
| 3,783,092 | 1/1974 | Majumdar................ 106/50 X |
| 3,785,836 | 1/1974 | Bacon.................... 106/50 |
| 3,817,764 | 6/1974 | Wolf..................... 106/50 |
| 3,861,925 | 1/1975 | Wolf..................... 106/52 X |
| 3,861,926 | 1/1975 | Irlan..................... 106/50 |
| 3,861,927 | 1/1975 | Kimure et al............. 106/52 X |

FOREIGN PATENTS OR APPLICATIONS

791,374  2/1958  United Kingdom

OTHER PUBLICATIONS

"Refractory Glass Fibers," Gates, Jr. et al., *Ceramic Bulletin*, vol. 46, No. 2 (1967), pp. 202–205.

*Primary Examiner*—Winston A. Douglas
*Assistant Examiner*—Mark Bell
*Attorney, Agent, or Firm*—Cushman, Darby & Cushman

[57] ABSTRACT

Glass compositions, having improved chemical resistance and useful in the form of fibers for reinforcing cementitious materials, consisting essentially of:

from 50 to 75 percent by weight Silica
from 10 to 25 percent by weight $R_2O$
from 1 to 15 percent by weight Titania
from 1 to 20 percent by weight Zirconia
from 0.8 to 20 percent by weight Rare Earth Oxide
from 0 to 20 percent by weight Boric Oxide
from 0 to 10 percent by weight $R^1O$
from 0 to 1 percent by weight Fluorine as (fluoride)
from 0 to 2 percent by weight $Al_2O_3$
from 0 to 1 percent by weight $P_2O_5$
from 0 to 1 percent by weight Chlorine (as chloride)

where $R_2O$ is sodium oxide, potassium oxide or a mixture of both, optionally including up to 5% by weight of lithium oxide (based on the total composition) and $R^1O$ is MgO, CaO, BaO or SrO, or a mixture of two or more thereof.

21 Claims, No Drawings

GLASS COMPOSITIONS AND FIBERS MADE THEREFROM

This application is a continuation -in- part of new earlier application Ser. No. 441,984 filed Feb. 13, 1974, now abandoned.

BACKGROUND OF THE INVENTION

This invention concerns improvements in or relating to glass compositions, fiber made therefrom and cementitious materials including such fiber as reinforcement.

Glass compositions, containing beryllia, magnesia, strontium oxide, titania, cadmium oxide or zirconia have been known for many years (see, for example, U.K. Patent Specification Nos. 595,498 and 791,374 and U.S. Pat. No. 2,640,784). From these, refractory glass fiber and other articles may be made.

More recently, U.S. Pat. No. 2,877,124 discloses compositions which are chemically durable, have a low liquidus temperature and slow devitrification and are capable of being formed into fibers by rotary spinning and attenuation of the strands so obtained. These compositions comprise, in weight percent;

| | |
|---|---|
| $SiO_2$ | 50 to 65 |
| $Al_2O_3$ | 0 to 8 |
| CaO | 3 to 4 |
| MgO | 0 to 10 |
| $Na_2O, K_2O, Li_2O$ | 10 to 20 |
| $B_2O_3$ | 5 to 15 |
| $TiO_2$ | 0 to 8 |
| $ZrO_2$ | 0 to 8 |
| BaO | 0 to 8 |
| $Fe_2O_3$ | 0 to 12 |
| MnO | 0 to 12 |
| ZnO | 0 to 2 | and preferably are essentially free from at least a majority of the six last-named components.

U.S. Pat. No. 3,127,277 discloses glasses of high modulus of elasticity, of composition, in weight percent:

| | |
|---|---|
| $SiO_2$ | 45 – 60 |
| CaO | 9 – 19 |
| MgO | 6 – 10 |
| BeO | 7 – 12 |
| $ZrO_2$ | 1 – 3 |
| $Li_2O$ | up to 4 |
| $TiO_2$ | 2 – 10 |
| $CeO_2$ | up to 4 | optionally including other ingredients such as $Fe_2O_3$ and $Al_2O_3$.

U.S. Pat. No. 3,817,764 discloses glass compositions, in weight percent:

| | |
|---|---|
| $SiO_2$ | 49 – 57 |
| $Al_2O_3$ | 3 – 5 |
| $B_2O_3$ | 6 – 12 |
| $Na_2O$ | 18 – 20 |
| CaO | 0 – 2 |
| $TiO_2$ | 9 – 12 |
| $ZrO_2$ | 0 – 7 |
| $Fe_2O_3$ | 0 – 0.5 |
| $LiO_2$ | 0 – 1 | and states that glass fibers which are especially water durable, and can be made from these compositions by rotary or centrifugal spinning.

Finally, U.S. Pat. No. 3,861,925 discloses alkali resistant fiberizable glass compositions which are zirconia free and consist essentially of, in weight percent.

| | |
|---|---|
| $SiO_2$ | 55 – 65 |
| $TiO_2, La_2O_2$ or $CeO_2$, | 12 – 25 |
| CaO | 4 – 6 |
| $Na_2O$ | 12 – 18 |
| $K_2O$ | 0 – 3 |

Despite such disclosures, however, there is still a need for glasses having improved chemical durability — in particular improved resistance to alkali attack, for example for use in reinforcing cementitious articles.

DETAILED DESCRIPTION OF THE INVENTION

According to the present invention, a glass composition consists essentially, by weight of the composition, of:

from 50 to 75% Silica
from 10 to 25% $R_2O$
from 1 to 15% Titania
from 1 to 20% Zirconia
up to 20% Rare Earth Oxide
from 0 to 20% Boric Oxide
from 0 to 10% $R^1O$
from 0 to 1% Fluorine (as fluoride)
from 0 to 2% $Al_2O_3$ where $R_2O$ is sodium oxide, potassium oxide or a mixture of both, optionally including up to 5% by weight lithium oxide (based on the total composition), and $R_1O$ is MgO, CaO, BaO or SrO, or a mixture of two or more thereof.

A preferred glass composition consists essentially, by weight of the compositions, of:

from 50 - 58% Silica
from 11-14% $R_2O$
from 8 - 10% Titania
from 10-14% Zirconia
from 0.8 - 15% Rare Earth Oxide
from 0.5 - 4% Boric Oxide
from 0.1 - 6% $R^1O$
from 0 - 1% Fluorine (as fluoride)
from 0.1 - 0.4% Chlorine (as chloride)

Wherein $R_2O$ is selected from the group consisting of $Na_2O$, $K_2O$ and mixtures of the two and mixtures thereof additionally containing up to 1% by weight lithium oxide (based on the total weight of the composition) and $R^1O$ is selected from the group consisting of MgO, CaO, BaO, SrO and mixtures of two or more thereof.

The compositions preferably comprise at least 20% by weight of $ZrO_2$ and $TiO_2$ together, and at least 23% by weight of $ZrO_2$, $TiO_2$ and rare earth oxide together.

The composition preferably contains not more than 30%, and more preferably not more than 25% by weight, of titania and zirconia together, and not more than 7% by weight of $R^1O$. The $R^1O$ and F may be deliberately added to the composition, within the ranges of content stated above. If $Li_2O$ is used in place of fluorine then comparable amounts of $Al_2O_3$ will be added (neccessarily but not desirably) by way of the raw materials commercially available at present. $Al_2O_3$ should not exceed more than 2% by weight of the composition.

The inclusion of a rare earth (metal) oxide imparts to the glass compositions of this invention a degree of alkali resistance not, in general, exhibited by glass compositions of otherwise similar formulation. At least 0.8% rare earth oxide is present in the composition.

The rare earth oxide used may be any of the naturally occurring ones, preferably ceric oxide, or a mixture of naturally occuring rare earth oxides. The term "naturally occurring rare earth oxide mixture" is well recognised in the Art used in the following examples according to its accepted meaning denoting a mixture of rare earth metal compounds (mainly the oxides) in which such metals are present in relative abundancies approximately equivalent to their naturally occurring relative abundancies. Such mixtures are constituted by, for example, a natural rare earth ore such as bastnaesite or monazite; the term is also used as herein to denote such an ore which has been treated to remove undesirable components such as carbonate, phosphate or fluoride ions. When bastnaesite, for example, is treated to remove such ions, the rare earth metal content remains constant, and remains proportional to the naturally occurring abundance.

The detrimental effect of excessive amounts of certain ions, such as phosphate or fluoride, in glass making is well known to those skilled in the art, so as suitable naturally occurring rare earth oxide mixture can be prepared by taking an ore such as bastnaesite or monazite and pre-treating it in an appropriate manner.

It is already well known that the chemical properties of rare earth metals and their oxides are markedly similar; I would expect that most, if not all, of the rare earth oxides — and particularly any mixture thereof containing cerium — give a result closely similar to the results obtained from compositions containing cerium oxide as the sole rare earth oxide.

The glass compositions of this invention consist essentially of the ingredients specified above, but may be found to include also a trace amount, i.e. up to about 1%, of phosphate and/or of chlorine present as the chloride.

Preferred embodiments of the invention, embodying the above principles, are illustrated in the following Examples 1 to 5; comparative results for a modified prior art composition are illustrated in Example A.

EXAMPLE 1

A glass of the following composition was prepared and was melt drawn at 1230°C:

| | |
|---|---|
| Silica | 50% weight |
| Sodium Oxide | 10% |
| Lithium Oxide | 1% |
| Boric Oxide | 3% |
| Titania | 10% |
| Zirconia | 10% |
| Cerium Oxide | 15% |
| Sodium Fluoride | 1% |

The glass fibers obtained exhibited a tensile strength of 1.36 GPa (Giga Pascals - equivalent to $GN/m^2$).

Fibers of this composition were boiled in saturated $Ca(OH)_2$ for 4 hours, washed successively with water, 1% hydrochloric acid (1 minute), water, and acetone, and then dried. The strength of the fiber was increased to 1.55 GPa.

EXAMPLES 2 TO 5

Glasses of various compositions as set forth in the following table were melt drawn, and the tensile strength thereof was determined before and after alkali treatment, with the results shown.

| Composition | Examples | | | |
|---|---|---|---|---|
| % by weight | 2 | 3 | 4 | 5 |
| $SiO_2$ | 58 | 56 | 58 | 58 |
| $Li_2O$ | — | — | — | — |
| $Na_2O$ | 13 | 12 | 14 | 13 |
| $TiO_2$ | 9 | 8 | 10 | 7 |
| $ZrO_2$ | 12 | 13 | 13 | 14 |
| $B_2O_3$ | 3 | 3 | 4 | 0.5 |
| CaO | — | 6 | — | 4 |
| BaO | — | — | 0.1 | 0.6 |
| $CeO_2$ | 5 | 2 | — | — |
| Naturally occurring Rare Earth Oxide mixture* | — | — | 0.8 | 2.5 |
| F | — | — | — | — |
| Cl | — | — | 0.1 | 0.4 |
| Tensile Strength (GPa) before alkali treatment | 1.22 | 1.04 | 1.07 | 1.25 |
| Tensile Strength (GPa) after alkali treatment | 0.87 | 0.63 | 0.73 | 1.19 |

*Obtained by treating a bastnaesite ore to remove carbonate and fluoride ions.

The alkali resistance of the above compositions make them eminently suitable for use as fibrous reinforcement in cementitious materials. They may be used in an amount up to 30% by weight of the total dry weight of cementitious materials, preferably in an amount of from 5 to 10% by weight.

COMPARATIVE EXAMPLE A

I. A composition was made as disclosed in Example 2 of U.S. Pat. No. 2,877,124 (which Example contains the maximum proportions of $TiO_2$ and $ZrO_2$ exemplified in this patent), and to this composition an addition of 4% by weight of $CeO_2$ was made, 4% $CeO_2$ being the maximum content of rare earth oxide mentioned in U.S. Pat. No. 3,127,277, to provide the following glass composition:

| | |
|---|---|
| $SiO_2$ | 50.98 weight % |
| $B_2O_3$ | 6.04 |
| $Al_2O_3$ | 2.38 |
| $Fe_2O_3$ | 2.97 |
| MgO | 3.60 |
| CaO | 7.40 |
| BaO | 2.80 |
| $Na_2O$ | 12.90 |
| $TiO_2$ | 2.97 |
| $ZrO_2$ | 3.40 |
| $CeO_2$ | 4.00 |

At first instance it might appear that this modified composition should provide fibers of an alkali resistance equivalent to that obtained by use of the present invention. I have found, however, that such similar properties are not obtained as demonstrated below.

Fibers were made from this composition, and were tested for alkali resistance, by the methods described in the preceding Examples.

The following results were obtained:
Strength before alkali treatment 0.99GPa
Strength after alkali treatment 0.64GPa II. A composition as in (I) above, but containing no rare earth oxide was formed into fibers, and these were tested, by the same methods, with the following results:
Strength before alkali treatment 1.24GPa
Strength after alkali treatment 0.48GPa The fibers exemplified in Examples 1 to 5 have strengths after alkali treatment of from 1.04 to 1.55 GPa, which clearly shows that fibers produced from these compositions exhibit considerably greater strengths after alkali treatment than can fibers produced by the modification referred to above. That is, fibers made in accordance with this invention have greater alkali resistance.

III. As a further comparison, Example 2 was repeated using 4% ceric oxide; this gave fibers having a strength of 0.94 GPa before treatment with alkali, and 0.90 GPa after alkali treatment. Without any ceric oxide a similar composition gives a strength of 0.66 GPa before treatment and 0.57 after alkali treatment. Thus, the percentage decline in the strength of fibers made from Example 2 composition, with or without ceric oxide, is less than for an Example A (I) composition with ceric oxide.

Obviously, modifications may be made in the compositions of this invention as exemplified above. It should be noted, however, that certain compositions within the composition ranges of this invention may not necessarily exhibit an especially marked increase in alkali resistance over similar compositions not containing rare earth oxide, or may exhibit a tendency to devitrify during fibre drawing; accordingly, the considerations and adjustments already used in glass technology to account for these difficulties should be applied to the invention for such compositions, not exemplified above, as come within the scope of the invention.

I claim:

1. A glass composition, having improved chemical resistance to alkali attack, consisting essentially of:
   from 50 to 75 percent by weight Silica
   from 10 to 25 percent by weight $R_2O$
   from 1 to 15 percent by weight Titania
   from 1 to 20 percent by weight Zirconia
   from 0.8 to 20 percent by weight Rare Earth Oxide
   from 0 to 20 percent by weight Boric Oxide
   from 0 to 10 percent by weight $R^1O$
   from 0 to 1 percent by weight Fluorine (as fluoride)
   from 0 to 2 percent by weight $Al_2O_3$
   from 0 to 1 percent by weight $P_2O_5$
   from 0 to 1 percent by weight Chlorine (as chloride)
   wherein $R_2O$ is selected from the group consisting of $Na_2O$, $K_2O$, mixtures thereof, and mixtures thereof containing up to 5% by weight lithium oxide (based on the total weight of the composition) and $R^1O$ is selected from the group consisting of MgO, CaO, BaO, and SrO, and mixtures of two or more thereof.

2. A glass composition according to claim 1, including not more than 30% by weight of the titania and zirconia together.

3. A glass composition according to claim 1, comprising at least 20% by weight of $ZrO_2$ and $TiO_2$ together.

4. A glass composition according to claim 1, comprising at least 23% by weight of $ZrO_2$, $TiO_2$ and rare earth oxide together.

5. A glass composition according to claim 1, including not more than 7% by weight of the $R^1O$.

6. A glass composition according to claim 1, wherein any of $R^1O$, fluorine, $Al_2O_3$, $P_2O_5$ or chlorine's present in impurity amounts.

7. A glass composition according to claim 1, containing not more than 15% by weight of zirconia.

8. Glass fiber having a composition as defined in claim 1.

9. Cementitious material, including as reinforcement therein up to 30% by weight of glass fiber as defined in claim 6.

10. A glass composition consisting of:

| | |
|---|---|
| Silica | 50% by weight |
| Sodium Oxide | 10% |
| Lithium Oxide | 1% |
| Boric Oxide | 3% |
| Titania | 10% |
| Zirconia | 10% |
| Cerium Oxide | 15% |
| Sodium Fluoride | 1%. |

11. A glass composition according to claim 10, in the form of fibers.

12. A glass composition consisting of:

| | |
|---|---|
| Silica | 58% by weight |
| Sodium Oxide | 13% |
| Titania | 9% |
| Zirconia | 12% |
| Boric Oxide | 3% |
| Ceric Oxide | 5%. |

13. A glass composition according to claim 12, in the form of fibers.

14. A glass composition consisting of:

| | |
|---|---|
| Silica | 56% by weight |
| Sodium Oxide | 12% |
| Titania | 8% |
| Zirconia | 13% |
| Boric Oxide | 3% |
| Calcium Oxide | 6% |
| Ceric Oxide | 2%. |

15. A glass composition according to claim 14, in the form of fibers.

16. A glass composition consisting essentially of:

| | |
|---|---|
| Silica | 58% by weight |
| Sodium Oxide | 14% |
| Titania | 10% |
| Zirconia | 13% |
| Boric Oxide | 4% |
| Barium Oxide | 0.1% |
| Mixture of naturally accuring rare earth oxides | 0.8% |
| Cl | 0.1%. |

17. A glass composition according to claim 16, in the form of fibers.

18. A glass composition consisting essentially of:

| | |
|---|---|
| Silica | 58% by weight |
| Sodium Oxide | 13% |
| Titania | 7% |
| Zirconia | 14% |
| Boric Oxide | 0.5% |
| Calcium Oxide | 4% |
| Barium Oxide | 0.6% |
| Mixture of naturally accurring rare earth oxides | 2.5% |
| Cl | 0.4%. |

19. A glass composition according to claim 18, in the form of fibres.

20. A glass composition, having improved chemical resistance to alkali attack, consisting essentially of:

| | | | | |
|---|---|---|---|---|
| from 50 – 58 | percent | by | weight | Silica |
| " 11 – 14 | " | " | " | $R_2O$ |
| " 8 – 10 | " | " | " | Titania |
| " 10 – 14 | " | " | " | Zirconia |
| " 0.8 – 15 | " | " | " | Rare Earth Oxide |
| " 0.5 – 4 | " | " | " | Boric Oxide |
| " 0.1 – 6 | " | " | " | $R^1O$ |
| " 0 – 1 | " | " | " | Fluorine (as fluoride) |

-continued
" 0.1 – 0.4 " " " Chlorine (as chloride)

Wherein R2O is selected from the group consisting of Na$_2$O, K$_2$O, mixtures of the two, and mixtures thereof additionally containing up to 1% by weight lithium oxide (based on the total weight of the composition) and R$^1$O is selected from the group consisting of MgO, CaO, BaO, SrO and mixtures of two or more thereof.

21. A glass composition according to claim 20, in the form of fibers.

* * * * *